United States Patent [19]

Hirschmann et al.

[11] Patent Number: 4,526,294

[45] Date of Patent: Jul. 2, 1985

[54] DISPENSER FOR DISPENSING LIQUIDS IN CONTROLLED QUANTITIES FROM A BOTTLE

[75] Inventors: Adolf M. Hirschmann, Heilbronn; Klaus Käser, Weinsberg; Hans Rieker, Eberstadt; Hans-Peter Busch, Heilbronn; Willi Rathke, Erlenbach; Heinz P. Maul, Eberstadt, all of Fed. Rep. of Germany

[73] Assignee: Glasgerätebau Hirschmann, Eberstadt, Fed. Rep. of Germany

[21] Appl. No.: 468,486

[22] Filed: Feb. 22, 1983

[30] Foreign Application Priority Data

Feb. 22, 1982 [DE] Fed. Rep. of Germany ....... 3206307
Mar. 9, 1982 [DE] Fed. Rep. of Germany ....... 3208436

[51] Int. Cl.³ .............................................. B67D 5/32
[52] U.S. Cl. ..................................... 222/47; 222/309; 222/383; 73/864.18; 92/13.4; 604/183; 604/208
[58] Field of Search ............... 73/864.18; 92/13, 13.4; 604/181, 183, 208, 210; 222/43, 49, 50, 309, 383, 41, 47, 384

[56] References Cited

U.S. PATENT DOCUMENTS

| | | | |
|---|---|---|---|
| 796,925 | 8/1905 | McDermott | 92/13.4 X |
| 1,979,428 | 11/1934 | Wheeler | 222/43 X |
| 2,605,763 | 8/1952 | Smoot | 222/43 X |
| 3,097,763 | 7/1963 | Aluotto | 222/309 X |
| 3,729,022 | 4/1973 | Roach | |
| 4,273,257 | 6/1981 | Smith et al. | 222/309 X |
| 4,306,670 | 12/1981 | Oshikubo | 222/309 |
| 4,445,626 | 5/1984 | Steffen et al. | 222/47 |

FOREIGN PATENT DOCUMENTS

2343687 3/1975 Fed. Rep. of Germany .
3031830 3/1982 Fed. Rep. of Germany .

*Primary Examiner*—Joseph J. Rolla
*Attorney, Agent, or Firm*—Fleit, Jacobson, Cohn & Price

[57] ABSTRACT

A dispenser for dispensing controlled quantities of liquid from a bottle includes a piston, which is movable in a cylinder and serves to suck and discharge an adjustable quantity of liquid. The cylinder is secured to a valve block, which contains a suction valve and a discharge valve. A cylindrical sleeve surrounds the cylinder and defines an annular clearance therewith. To change the length of the stroke of the piston and the quantity of liquid which is to be sucked and discharged depends on the stroke length, an adjustable stop and a fixed stop, which is engageable with the adjustable stop and are accommodated in the clearance. In order to simplify the design of such dispenser and to improve the correctness, accuracy and reproducibility of its adjustment in that the characteristics are rendered independent from the subjective reliability of the operator, and to permit the variable and correctly reproducible adjustment for a desired quantity of liquid to be effected in a simpler manner and quicker, the two stops are axially fixed relative to the piston and the cylinder. To permit a change of the length of the stroke of the piston, the adjustable stop is rotatably mounted in the dispenser and is adapted to be releasably locked in each of a plurality of adjusted angular positions by resilient detents.

8 Claims, 5 Drawing Figures

DISPENSER FOR DISPENSING LIQUIDS IN CONTROLLED QUANTITIES FROM A BOTTLE

BACKGROUND OF THE INVENTION

This invention relates to a dispenser for dispensing liquids in controlled quantities from a bottle comprising a piston, which is adjustably guided in a cylinder and serves to suck and discharge an adjustable quantity of liquid, wherein said cylinder is secured to a valve block, which contains a suction valve and a discharge valve, a cylindrical sleeve surrounds said cylinder and defines an annular clearance therewith, and said annular clearance contains a stop, which is adjustable to change the length of the stroke of the piston and the quantity of liquid which is to be sucked and to be dispensed, which quantity depends on said stroke, and a fixed stop, which cooperates with said adjustable stop.

A bottle dispenser is known from U.S. Pat. No. 3,729,022. An annular stop is provided, which is an interference fit on the glass cylinder. When the dispenser has been taken apart and the glass cylinder is immersed into hot water, the annular stop can be displaced. The lower portion of the cylindrical sleeve comprises a flexible finger, which is defined by a pair of slots and at its lower end has an inwardly extending flange portion, which constitutes the fixed stop. Because in that known dispenser the piston and the cylindrical sleeve must be removed whenever it is desired to alter the length of the stroke of the piston, and the quantity of liquid which is to be sucked and discharged, which quantity depends on said stroke, there is a desire to provide a dispenser in which the adjustment of the adjustable stop to a desired quantity of liquid can be effected from the outside, as is known from bottle dispensers of a different type. In two known bottle dispensers of the kind in question here, the vertically adjustable stop can be vertically adjusted and fixed in position from the outside. German Patent Specification No. 23 43 687 discloses a bottle dispenser comprising a fixed stop, which remains on a given level and is disposed at that end of the cylinder which is remote from the valve block and the cylindrical sleeve has a longitudinal slot, which has a length that is approximately as large as the distance by which the stroke length of the piston can be adjusted. The adjustable stop is disposed in said slot and because it is segment-shaped it can be adjusted and fixed in position from the outside by means of a set screw, which is provided on the cylindrical sleeve. In the known bottle dispenser, the accuracy (variation from the average value, if the average value is correct) and the correctness (deviation of the average value from the nominal value read from the scale) will always depend on the adjustment of the fixed stop which is disposed at the end of the cylinder and consists of a ring which has been shrunk on the cylinder. When the glass cylinder has been axially shifted in the valve block, the position of the fixed stop relative to the printed scale or the molded rack will no longer be correct. This will also be the case when the fixed stop has been shifted. Besides, the set screw may become loose, particularly after prolonged use, so that the adjustable stop clamped in the longitudinal slot of the cylindrical sleeve comes loose and the adjustable stop which is fixed by the screw is not properly guided. This may result in a change of the correctness and reproducibility of any adjustment during a series of dispensing operations. Another disadvantage resides in that a change of the desired quantity of liquid requires the loosening and subsequent tightening of the set screw so that individual errors may occur in addition to variable system errors. It has now been shown that the known dispenser has substantial sources of error.

In the dispenser known from Laid-open German Application No. 30 31 830, an additional sleeve for guiding the adjustable stop is provided between the cylinder and the cylindrical sleeve and the adjustable stop consists of a helical slider, which extends into an axial groove formed in one of said sleeves and into a helical groove formed in the other of said sleeves. Upon a rotation of the cylindrical sleeve and the guiding sleeve relative to each other, the adjustable stop is raised or lowered like a cam follower, in dependence on the direction of the relative rotation. For this purpose the cylindrical sleeve is held in position with one hand and the other hand is used to rotate the guiding sleeve by means of a handle. That design ensures that the adjustable stop will be reliably held in position in the crossing grooves when the adjustable stop has been adjusted so that the corresponding quantity of liquid will be exactly dispensed even when the bottle dispenser is used very often. The provision of the helical groove permits also an infinite, fine adjustment of different quantities of liquid. The steep helix in which the slider is guided can easily be shifted by a hard shock because the slider is not held in its adjusted position in practice by the component of force which acts in the longitudinal direction of the helix. Small errors of about 0.5% are not detected by the eye. Besides, parts which are movable relative to each other and frictional joints are likely to be subjected to wear, which will increase the backlash.

SUMMARY OF THE INVENTION

For this reason it is an object of the invention to provide a bottle dispenser which is of the kind described hereinbefore and which is simpler in design and capable of a more highly accurate and reproducible adjustment in that the accuracy and reproducibility are rendered independent of the subjective reliability of the operator and the variable adjustment of a correctly reproducible quantity of liquid is simplified and can be effected more quickly.

This object is accomplished according to the invention in that two stops are axially fixed relative to the cylinder and the piston, the adjustable stop is mounted to be rotatable in the peripheral direction of the dispenser for an adjustment of the length of the stroke of the piston, and resilient detent means are provided for locking the adjustable stop in any of a plurality of adjusted positions. Whereas all known dispensers have stops which are vertically adjustable and which must be detached from the remainder of the dispenser before an adjustment can be effected, the dispenser according to the invention has no detachable stop so that a certain stroke length can reliably be re-adjusted. In the known dispensers, the adjustment of two marks relative to each other depends on the acuity of the human eye. That function is performed in accordance with the invention by a resilient detent element. A coarse visual check whether the desired position has been reached will be sufficient. In the bottle dispenser disclosed in German Patent Specification No. 23 43 687, it will also be necessary to adjust the adjustable stop and that adjustment can be inadvertently changed and the embodiment comprising a rack also fails to assure a reproducibility of the adjustment. In the dispenser according to the invention the stops are stepped and held against rotation, the adjustable upper stop is locked by detent means, and the mutually engageable surfaces of the stops extend at right angles to the direction of the axial force so that there will be no component of force in the longitudinal direction of a helix. The use of the stepped member which is provided in accordance with the invention, as an adjustable stop, affords the advantage that the desired quantity of liquid selected by an adjustment in predetermined increments will be more correctly reproducible. The correct and reproducible adjustment of the quantity of liquid depends no longer on the subjective accuracy of an adjustment effected by an operator, which accuracy may vary for different operators. The system provided according to the invention permits an adjustment in predetermined increments because the two spring elements snap in with an audible click. The design is simpler than that disclosed in Laid-open German Application No. 30 31 830 because the need for an additional sleeve for guiding the adjustable stop is eliminated. The design is more economical also in other respects because the parts are interfitted and there is no need for adhesives and/or screws. When the known dispenser is serviced, tools are required for loosening and tightening such screws and such tools are usually not available in a laboratory. Because the adjustable stop does not constitute a slider which is movable in a cam slot, the adjustable stop will not be worn by abrasion. There is no movement of the surfaces of the adjustable stop and of a cam slot in sliding contact with each other so that the abrasion which is due to such sliding movement will be eliminated and the reproducibility of the adjustment will be further improved. As the adjustable stop provided according to the invention engages stepped surfaces of the fixed stop, the stops provided according to the invention are subject to very little wear. A material which has proved suitable for the stops consists of polyphenylsulfide reinforced with 40% glass fibers. That material can be molded and has a defined shrinkage of 0.2%. The servicing of the dispenser is also facilitated by the provision of the adjustable stop. The adjustment for a correctly reproducible quantity of liquid can be effected in a simpler manner and more quickly than in accordance with German Patent Specification No. 23 43 687 because the adjustable stop snaps into the adjusted position relative to the fixed stop without a need for a loosening and tightening of a set screw, which may not be properly guided. The dispenser according to the invention is unique in that a quantity of liquid which has been adjusted can be changed by a rotation of the axially fixed stop, which for this purpose consists of a solid of revolution. Both hands are required for rotating in the dispenser according to Laid-open German Application No. 30 31 830 the guide sleeve and the outer sleeve relative to each other. In the dispenser according to the invention it is sufficient to impart to the solid of revolution a simple rotation, which can be effected with one hand. By that rotation the steps of the adjustable stop are moved into register with those steps of the fixed stop which correspond to the desired stroke length. Thereafter the sucking and discharge of the desired quantity of liquid can be effected in that the piston is actuated to move the steps corresponding to the desired quantity of liquid into engagement as the fixed stop is connected to the piston by a common handle. That movement of the piston is required in any case.

If the valve block and the metering part are interconnected by a bayonet joint in the dispenser according to the invention, the latter is superior to those known dispensers which have been discussed hereinbefore in that it can be assembled and taken apart without a need for a tool. The glass cylinder is protected from mechanical damage because the known cylindrical sleeve has been designed to constitute a protective sleeve, which is firmly joined to the valve block. In the known bottle dispensers the glass cylinder can easily break because it is not surrounded and protected throughout its length by the cylindrical sleeve.

Further advantages of the dispenser according to the invention resides in that its several components are interfitted so that they need not be connected by adhesives or screws. This renders the manufacture of the dispenser more economical and facilitates the servicing of the dispenser. Besides, the reproducibility of the adjustment of the quantity of liquid is improved in that the components consisting of the adjustable stepped stop, the adjustable ring and the scale ring are held by the detent means against rotation relative to the protective sleeve.

BRIEF DESCRIPTION OF THE DRAWINGS

A preferred illustrative embodiment of the invention will now be described more in detail with reference to the accompanying drawing, in which.

DETAILED DESCRIPTION OF THE DRAWINGS

Figure 1:
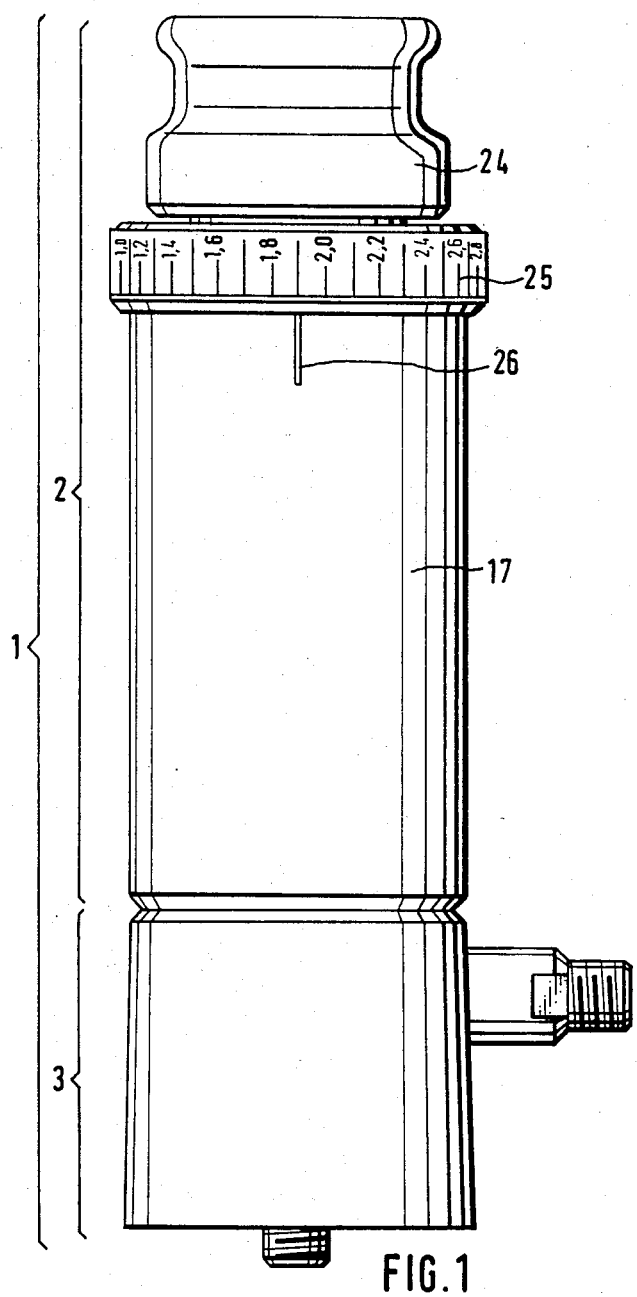
FIG. 1 is a side elevation showing a bottle dispenser according to the invention.

The bottle dispenser 1 comprises a metering part 2 at its top and a valve block 3 at its bottom. The design of the valve block 3 is known in the art. It comprises an internally screw-threaded insert 4, which is non-rotatably held in the valve block and can be screwed on external screw threads provided on the neck of a bottle, which is not shown. The valve block 3 contains a suction valve 5 and a discharge valve 6. A passage 7 extends upwardly in the valve block 3 from the suction valve 5 and opens into the cavity defined by a cylinder 8. A discharge passage 9 branches laterally from the passage 7 and incorporates the discharge valve 6. A discharge pipe 10 is provided at the outer end of the discharge passage 9. The two valves 5, 6 consist of check valves. The suction valve 5 and the discharge valve 6 each contain a valve ball 11 or 12. The valve ball 12 of the suction valve 6 is biased by a compression spring 13. The valve ball 11 of the suction valve 5 normally rests on the associated valve seat 14 under the action of gravity. The valve ball 12 of the discharge valve 6 is normally held on the associated seat 15 by the spring 13. As the piston 16 is raised, the valve ball 11 is lifted from the associated valve seat 14 whereas its valve ball 12 is still held on the associated seat. As the piston 16 is subsequently lowered so that the liquid which has been sucked is discharged through the discharge pipe 10, the suction valve 5 is closed and the discharge valve 6 is opened.

The cylinder 8 is secured to the valve block 3. The piston 16 is movable in the cylinder 8 to suck and discharge an adjustable quantity of liquid and is guided by the cylinder without abrasion because the bore of the glass cylinder is flared at its top end. Such a design cannot be adopted in the known dispensers because the upper, fixed stop thereof consists of a ring, which has been shrunk on the cylinder at its upper end. A protective sleeve 17 is fixed to the valve block 3 and surrounds the cylinder 8 so as to define an annular clearance 18 with the cylinder. The annular clearance between the cylinder 8 and the protective sleeve 17 accommodates a stop which is adjustable to vary the length of the stroke of the piston 16 and the quantity of liquid which is to be sucked and discharged and depends on the length of said stroke, and a fixed stop, which cooperates with the adjustable stop.

The adjustable upper stop is carried by an adjusting ring 20, which is mounted on the upper rim of the cylindrical sleeve 17. The latter is secured to the valve block 3 and thus protects the cylinder 8. The adjustable stop consists of a stepped member 21, which is molded on the inside surface of the adjusting ring 20, to which a scale ring 25 is non-rotatably connected, as is best apparent from FIG. 1.

The fixed stop consists of a stepped member 19, which rests on an abutment 23, which is provided in the protective sleeve 17. The stepped member 19 has two noses 22, which extend into respective longitudinal grooves 29, 30 of the protective sleeve 17 so that the stepped member 19 is held against rotation in the protective sleeve 17. The stepped member 19 is formed with fourty steps having a width of 3 millimeters each so that the scale can extend along a circumferential length of 110 mm whereas in the dispenser disclosed in Laid-open German Application No. 30 31 830 the scale has only a circumferential length of about 70 mm. The design according to the invention affords the advantage that a scale affording a higher resolution can be used and an adjustment throughout the length of the scale can be effected by a single revolution.

The volume which is adjusted depends on the extent to which the stepped member 19 is axially movable relative to the stepped member 21, which is carried by the adjusting ring 20. As the stepped member 19 and the piston 16 are connected by a common handle 24, the stepped member 19 can be raised by means of the handle 24.

The engaging surfaces of the stepped members 19 and 21 extend at right angles to the direction of the force by which the piston is actuated and consist of polyphenylenesulfide which is reinforced by glass fibers.

Figure 3:
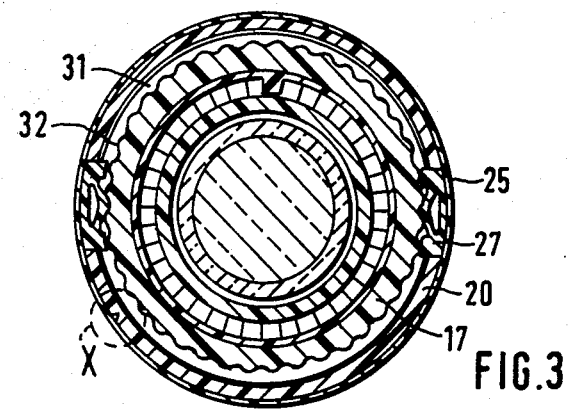
FIG. 3 is a sectional view taken on line A—A in FIG. 2.
Figure 4:
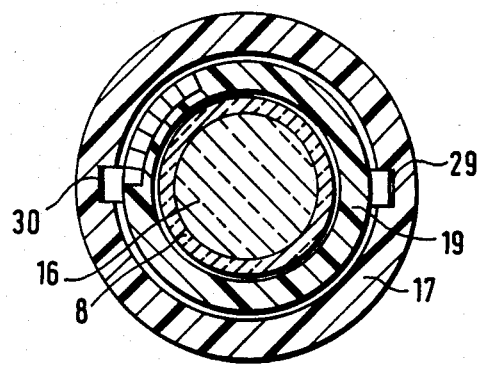
FIG. 4 is a sectional view taken on line B—B in FIG. 2.
Figure 5:
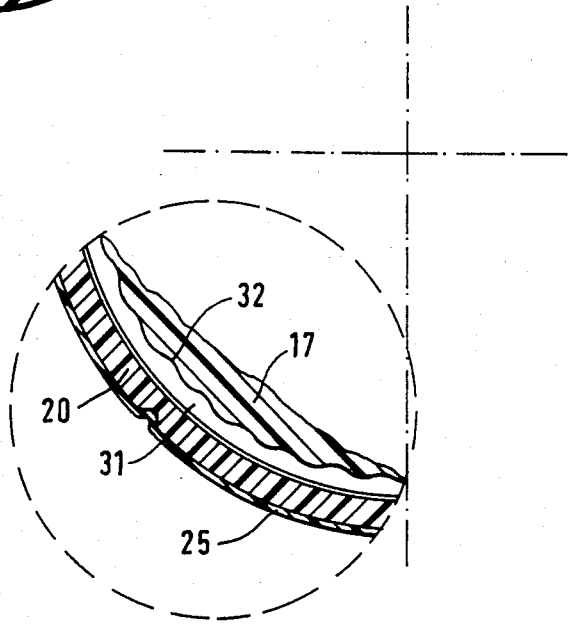
FIG. 5 is a sectional view taken on line A—A in FIG. 2 and illustrates a detail of the dispenser labelled X in FIG. 3, according to the invention.

By a simple rotation of the adjusting ring 20, that graduation of the scale ring 25 which corresponds to the desired volume is moved into registry with a reference mark 26 provided on the protective sleeve 17. Two spring elements 27 are provided, which are spaced 180° apart and accommodated in apertures of the adjusting ring and covered on the outside by the scale ring 25. After an adjustment to any of the quantities of liquid which correspond to respective graduations on the scale ring 25, these spring elements 27 snap into concave troughs of the undulating bottom 32 of a groove 31 which is formed in the protective sleeve 17, as is best apparent from FIGS. 3 and 5. The reproducibility of the adjustment of the dispenser to certain quantities of liquid is improved in that the stepped member 19, the protective sleeve 17, the adjusting ring 20 and the scale ring 25 are non-rotatably connected to each other by the spring elements 27 extending into the troughs formed in the bottom 32.

As the metering part 2 and the valve block 3 are joined by a bayonet joint, the entire bottle dispenser 1 is designed to be assembled and taken apart without a need for a tool.

Figure 2:
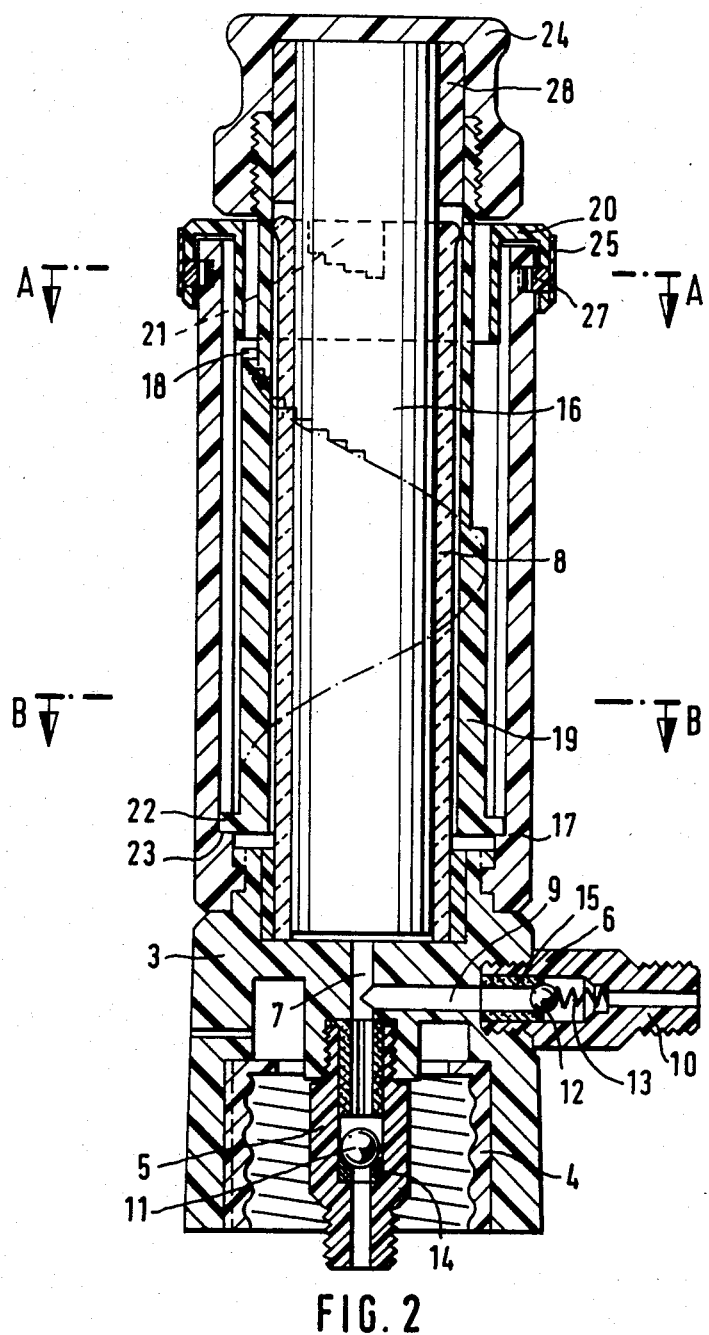
FIG. 2 is a longitudinal sectional view showing the bottle dispenser of FIG. 1.

To improve its slidability and the accuracy depending on said slidability, the piston 16 is made of a borosilicate glass tube and after a suitable surface pretreatment, the piston is provided with a layer of polyvinylidenefluoride by electrostatic coating. That layer has a very high resistance to chemicals of all kinds is different from layers of polytetrafluoroethylene which are porous. Besides, the polyvinylidenefluoride surface layer has a much higher abrasive strength. After the piston has been coated with the material applied as a powder, the coating is finish-ground with such a high precision that the piston can be replaceably fitted into the cylinder 8, which is also made of borosilicate glass and is also exactly sized. As is apparent from FIG. 2, the bore of the cylinder 8 flares at its top end and is flame-polished there so that any damage to the piston 16 will be avoided. For the same reasons and to improve the molding operation the stepped member 19 is connected to the piston 16 by means of the handle 24 and in a resilient fitting sleeve 28, which is made of polyethylene. In accordance with the invention the adjustable stop 20, 21, which is rotatable and axially fixed, and the fixed stop consisting of the stepped member 19 are so connected to each other by the protective sleeve 17 that the adjustable and fixed stops are held in their adjusted position by the spring elements 27 extending into the troughs in the bottom 32. The distance between the adjustable and fixed stops can be inadvertently changed only to the extent of the play between the interfitting parts; that play is less than 0.1% of the total stroke. In the known dispensers, the substantial sources of error (variable system errors plus individual human errors) are due to the fact that the metering elements are not assembled there to form a virtually rigid unit. Whereas the dispenser disclosed in German Patent Specification No. 23 43 687 provided with racks is also suitable for an adjustment in predetermined increments, a basic difference resides in that the incrementally adjusted components of the dispenser according to the invention are locked in position.

What is claimed is:

1. A dispenser for dispensing liquids in controlled quantities, said dispenser comprising;
   a cylinder adapted to be secured to a valve block,
   a piston adjustably guided in said cylinder for sucking and discharging an adjustable quantity of liquid,
   a handle means for moving said piston, said piston being secured at one end to said handle means,
   a cylindrical sleeve surrounding said cylinder and connected to said valve block at one end,
   an annular clearance defined between said cylindrical sleeve and said cylinder,
   an adjusting ring rotatably mounted on the other end of said cylindrical sleeve, said adjusting ring including two portions, a first portion located in said annular clearance and a second portion surrounding said cylindrical sleeve, an adjustable stop secured to said first portion of said adjusting ring for changing the length of a stroke of the piston and said quantity of liquid to be sucked and dispensed, said quantity of liquid depending on the length of said stroke, said adjustable stop defining a stepped configuration and being rotatable about the peripheral circumference of said cylinder, said adjustable stop being axially fixed relative to said cylindrical sleeve, a fixed stop located in said annular clearance and defining a detent shaped complementary to the stepped configuration of said adjustable stop, said fixed stop being secured at one end to said handle means and being slidably mounted in said cylindrical sleeve along the longitudinal axis of said cylindrical sleeve, the stepped configuration of said fixed stop spirally surrounding said cylinder in a single revolution, an undulating surface defined by said cylindrical sleeve located around its periphery and located between said first portion and said second portion of said adjusting ring, and detent means secured to said second portion of said adjusting ring and engaging said undulating surface of said cylindrical sleeve for fixing the position of said adjusting ring, said detent means being resiliently biased towards said undulating surface for locking said adjusting ring relative to said cylindrical sleeve, said cylindrical sleeve, said adjusting ring and said adjustable stop being rigidly locked to each other by said detent means and upon withdrawal of said piston from said cylinder by said handle means, said fixed stop engages said adjustable stop and said piston is fixed relative to said cylinder at a position determined by adjustment of said adjusting ring, said adjusting ring regulating the length of said stroke of said piston and thereby regulating the quantity of liquid to be sucked and dispensed.

2. A dispenser according to claim 1, characterized in that a scale ring is carried by and non-rotatably connected to the adjusting ring.

3. A dispenser according to claim 2, characterized in that said detent means includes two spring elements, which are spaced 180° apart and after an adjustment of the adjusting ring to any of a plurality of quantities of liquid corresponding to graduations of the scale ring, the spring elements enter concave troughs of said undulating surface which is formed in the cylindrical sleeve.

4. A dispenser according to claim 1, characterized in that the fixed stop includes two noses, which are received by respective longitudinal grooves formed in the cylindrical sleeve so that the fixed stop is axially guided and held against rotation by said noses in said grooves.

5. A dispenser according to claim 1, characterized in that said adjustable and fixed stops have surfaces at which they are engageable with each other and which extend at right angles to the axial direction of the cylinder.

6. A dispenser according to claim 1, characterized in that the adjustable and fixed stops consist of polyphenylensulfide which is reinforced by glass fibers.

7. A dispenser according to claim 1, characterized in that the cylinder is exactly sized and consists of borosilicate glass and has an inside surface which at its upper end is flared and flame-polished.

8. A dispenser according to claim 1, characterized in that the valve block and the cylinder are connected by a bayonet joint.

* * * * *